(12) United States Patent
Mathur et al.

(10) Patent No.: US 6,989,120 B2
(45) Date of Patent: Jan. 24, 2006

(54) HEAT-VULCANIZABLE SILICONE COMPOSITIONS FROM PREMIX

(75) Inventors: Devesh Mathur, Clifton Park, NY (US); Alan L. Tate, Buskirk, NY (US)

(73) Assignee: General Electric Company, Pittsfield, MA (US)

( * ) Notice: Subject to any disclaimer, the term of this patent is extended or adjusted under 35 U.S.C. 154(b) by 42 days.

(21) Appl. No.: 10/373,697

(22) Filed: Feb. 27, 2003

(65) Prior Publication Data

US 2003/0229175 A1 Dec. 11, 2003

Related U.S. Application Data

(63) Continuation-in-part of application No. 09/467,717, filed on Dec. 21, 1999, now Pat. No. 6,548,574.

(51) Int. Cl.
*B28C 47/38* (2006.01)

(52) U.S. Cl. .................. 264/211.21; 523/212; 524/588; 366/78; 366/79; 366/83; 366/85; 366/91

(58) Field of Classification Search .............. 366/78, 366/79, 83, 85, 91; 264/211.21; 523/212, 523/353; 524/588

See application file for complete search history.

(56) References Cited

U.S. PATENT DOCUMENTS

| | | | |
|---|---|---|---|
| 3,824,208 A | 7/1974 | Link et al. | |
| 4,528,324 A | 7/1985 | Chung et al. | |
| 4,737,561 A | 4/1988 | Stary et al. | |
| 4,785,047 A | 11/1988 | Jensen | |
| 4,898,898 A | 2/1990 | Fitzgerald et al. | |
| 5,018,673 A | 5/1991 | Ench et al. | |
| 5,153,238 A | 10/1992 | Bilgrien et al. | |
| 5,198,171 A | 3/1993 | Kasahara et al. | |
| 5,338,112 A | 8/1994 | Boden et al. | |
| 5,409,978 A | 4/1995 | Hanada et al. | |
| 5,486,551 A | 1/1996 | Polmanteer | |
| 5,531,923 A | 7/1996 | LeBlanc et al. | |
| 5,573,189 A | 11/1996 | Ward et al. | |
| 5,623,028 A | 4/1997 | Fitzgerald et al. | |
| 5,679,726 A | 10/1997 | Gutek et al. | |
| 5,910,276 A | 6/1999 | Guntherberg et al. | |
| 5,925,709 A | 7/1999 | Takahashi et al. | |

FOREIGN PATENT DOCUMENTS

| | | |
|---|---|---|
| EP | 0 570 387 B1 | 1/1992 |
| EP | 0 902 057 A2 | 3/1999 |
| EP | 1110696 A2 * | 6/2001 |

* cited by examiner

*Primary Examiner*—Margaret G. Moore
*Assistant Examiner*—Marc S Zimmer
(74) *Attorney, Agent, or Firm*—Philip D. Freedman; Kenneth S. Wheelock

(57) ABSTRACT

A continuous process of preparing a heat-vulcanizable filled silicone composition, comprises mixing filler and high viscosity silicone polymer continuously in a first co-rotating intermeshing twin screw extruder; and compounding a filler and silicone polymer mixture from the first extruder in a second single shaft reciprocating extruder. Another continuous process of preparing a heat-vulcanizable filled silicone composition, comprises forming a premix' of filler and high viscosity silicone polymer; mixing the premix and additional high viscosity silicone polymer continuously in a co-rotating intermeshing twin screw extruder; and compounding a filler and silicone polymer mixture from the co-rotating intermeshing twin screw extruder in a second single shaft reciprocating extruder.

16 Claims, 2 Drawing Sheets

HEAT-VULCANIZABLE SILICONE COMPOSITIONS FROM PREMIX

This application is a continuation-in-part application to Mathur et al., application Ser. No. 09/467,717, filed Dec. 21, 1999, now U.S. Pat. No. 6,548,574.

BACKGROUND OF THE INVENTION

The invention relates to a process for preparing heat-vulcanizable silicone compositions. Particularly, the invention relates to a process for preparing heat-vulcanizable silicone compositions from an untreated filler and silicone polymer premix.

A heat-vulcanizable silicone composition comprises a high viscosity silicone polymer, an inorganic reinforcing filler and various additives that aid processing or impart desired final properties to the composition. A vulcanizing agent can be added and the composition heat-cured to fabricate silicone rubber moldings such as gaskets, medical tubing and computer keypads.

The heat-vulcanizable silicone composition can be prepared from a concentrate called a premix. A premix is an extrudable composition formed of a blend of a polymer and a finely divided filler, prepared by combining the materials under high shear force conditions in the presence of a liquid processing aid. The liquid processing aid treats filler silanol groups. Residual silanol groups on the surface of the filler can govern strength of hydrogen bonds between the silica and hydroxyl or oxygen groups in the silicone polymer chain. High concentrations of residual silanols in a filler cause "structuring" or "crepe hardening" of the final product in storage. This effect leads to difficulties in the processing of the material after it has been stored for extended periods. Typically, a treating agent is added to reduce silanol functional groups to a required concentration.

Large interfacial forces develop between silicone polymer and free, unreacted silanol groups present in filler. The treating agent must diffuse through a bulk of the high molecular weight silicone polymer and penetrate a rigid silicone polymer/filler interface to reach reactive silanol groups. Hence heretofore, the treating agent has been added either directly to the silica before the premix forming step or during the premix forming step under conditions of high shear mixing.

A treated premix is a damp composition that is more difficult to store or to transport than a dry mix. Hence, treated premix is prepared and immediately charged into a subsequent extrusion step. For example, Kasahara al., U.S. Pat. No. 5,198,171, discloses preparing a premix of polydiorganosiloxane, inorganic filler and liquid treating agents in a high speed mechanical shearing mixer. The resulting premix is then compounded in a same-direction double screw extruder.

The difficulties of storing and transporting a damp treated premix place limitations on premix use and marketability. There is a need for a filler and silicone polymer premix with extended use properties.

SUMMARY OF THE INVENTION

The invention provides a process that utilizes untreated filler that has extended use properties. According to the invention, a continuous process of preparing a heat-vulcanizable filled silicone composition, comprising mixing filler and high viscosity silicone polymer continuously in a first co-rotating intermeshing twin screw extruder and compounding a filler and silicone polymer mixture from the first extruder in a second single shaft reciprocating extruder.

In an embodiment, the invention relates to a continuous process of preparing a heat-vulcanizable filled silicone composition, comprising forming a premix of filler and high viscosity silicone polymer, mixing the premix and additional high viscosity silicone polymer continuously in a co-rotating intermeshing twin screw extruder and compounding a filler and silicone polymer mixture from said co-rotating intermeshing twin screw extruder in a second single shaft reciprocating extruder

DETAILED DESCRIPTION OF THE INVENTION

Figure 1:
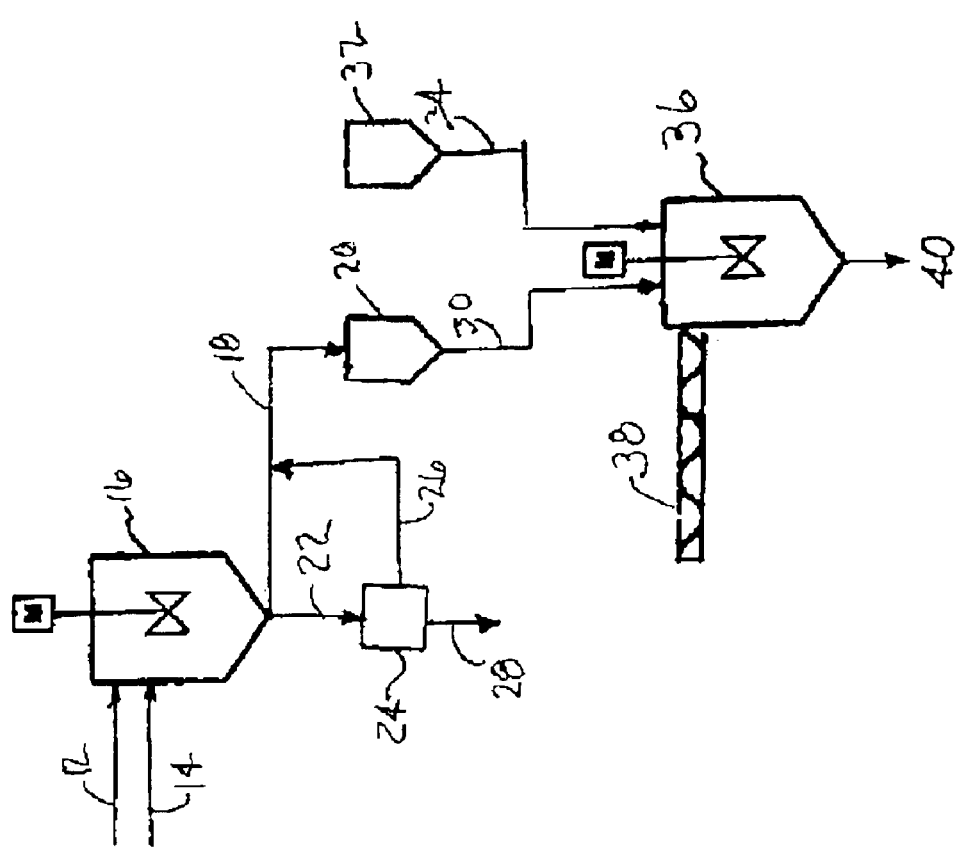
FIG. 1 is a schematic representation of a process for preparing a untreated filler and silicone polymer premix and preparing a heat-vulcanizable filled silicone composition from the premix.

According to the invention, high viscosity heat-vulcanizable silicone compositions are prepared directly from untreated premix. Untreated premix is a compounded mixture of a filler with silanol surface groups that have not been reacted with a treating agent and a high viscosity silicone polymer. Surprisingly, silanol groups of the silica of the premix can be adequately treated with treating agent during a subsequent compounding step with polymer gum in a high speed mixer or extruder.

The filler that can be used in the invention is any inorganic filler with silanol surface groups that can be used in blends with silicone polymers. Examples of inorganic fillers include a reinforcing silica such as fumed silica or precipitated silica. A single filler or a combination of fillers can be used to reinforce the silicone polymer.

The amount of filler in the premix can be from about 20 to about 150 parts by weight, desirably from about 30 to about 100 parts by weight and preferably from about 40 to about 70 parts by weight, per 100 parts by weight of the high viscosity silicone polymer. During the compounding step, addition of further silicone polymer reduces the proportion of filler in the final silicone composition to about 10 to about 100 parts by weight, desirably from about 15 to about 90 parts by weight and preferably from about 25 to about 70 parts by weight, per 100 parts by weight of the total high viscosity silicone polymer.

The high viscosity silicone polymer used in the compositions of the present invention is typically referred to as "gum" or "gum silicone." The polymer has a viscosity greater than 1,500,000 cps at 25° C. The viscosity can be greater than 4,000,000 cps and preferably is greater than 8,000,000 at 25° C.

The polymer can be represented by recurring units of Formula I:

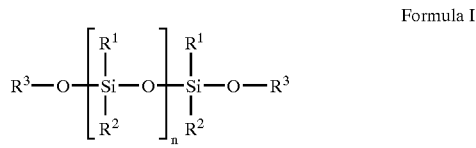

Formula I wherein, $R^1$ independently at each occurrence represents $C_{1-4}$ alkyl, or $C_{2-4}$ alkylene; $R^2$ independently at each occurrence represents $C_{1-4}$ alkyl, $C_1-C_4$ haloalkyl or $C_{2-4}$ alkylene; $R^3$ independently at each occurrence represents H, $C_1-C_{10}$ alkyl, $C_{2-4}$ alkylene, $C_{4-6}$ cycloalkyl, OH or $C_1-C_4$ haloalkyl; and n represents an integer from 1,000 to 20,000.

A further preferred composition comprises a silicone polymer wherein, $R^1$ independently at each occurrence represents, $CH_3$ or $CH-CH_2$; $R^2$ independently at each occurrence represents, $CH_3$, $CH=CH_2$ or $CH_2CH_2CF_3$; $R^3$ independently at each occurrence represents $CH_3$, $CH=CH_2$, OH or $CH_2CH_2CF_3$ and n represents an integer from about 4,000 to about 10,000.

Another embodiment provides a composition wherein the vinyl content of the silicone polymer ranges from about 0.05% to about 0.5% by weight of the silicone polymer. The treating agent is a silanol or methoxy stopped silicone fluid that reacts with the filler surface hydroxyl or silanol groups to prevent a condensation reaction among filler particles or between filler and gum molecules that otherwise leads to stiffening and loss of elastomeric properties. The treating agent reduces filler silanol groups and reduces the time required for aging of the silicone, to prevent crepe hardening and/or to regulate plasticity. The treating agent can be an organosilane, a low-viscosity polysiloxane or a silicone resin, which has a silanol group and/or an alkoxy group having 1 to 6 carbon atoms. Examples include diphenylsilanediol, dimethylsilanediol, methyltriethoxysilane and phenyltrimethoxysilane. The low-viscosity polysiloxane may contain one or more kinds of organic groups selected from a methyl group, a phenyl group, a vinyl group and a 3,3,3-trifluoropropyl group. Preferred silanol-reactant treating agents include silanol-stopped polydimethylsiloxane, octamethylcyclotetrasiloxane (D4) and hexamethyldisilazane (HMDZ). The viscosity of the polysiloxane measured at 25"C is in the range of from about 1 to about 300 cP, preferably from about 5 to about 100 cP.

The treating agent can be added in the compounding step in a weight proportion of about 0.1 to about 100 parts fluid to 100 parts of filler, desirably about 0.5 to about 75 parts fluid to 100 parts of filler and preferably about 1.0 to about 50 parts fluid to 100 parts of filler. The treating agent can react to reduce available groups of the filler to a concentration of between about 8 to about 2 hydroxyl groups/(nanometer)2 of filler, preferably between about 7 to about 3 hydroxyl groups/(nanometer)2 of filler. In an embodiment, the treating agent can be a combination of HMDZ and water. This combination can comprise a weight ratio of HMDZ/water of between about 1/0.1 to about 1/10 or between about 1/0.5 and about 1/5 or between about 1/1 and about 1/3.

The heat-vulcanizable silicone composition can also include other additives such as heat-resistance improvers such as oxides, hydroxides and fatty acid salts of metals, vulcanization reverse inhibitors, flame retardants such as platinum compounds, discoloration preventive agents, plasticizers such as silicone oil, internal release agents such as metal soaps, pigments and dyes.

Drawing FIG. 1 is a schematic representation of a process for preparing an untreated filler and silicone polymer premix and preparing a heat-vulcanizable filled silicone composition from the premix. In FIG. 1, untreated filler and silicone polymer are fed, 12 and 14, into first mixer 16, where an untreated premix is formed. The untreated premix is discharged directly 18 to feeder 20 or is sent 22 to a storage receptacle or area 24 for later charge 26 to the feeder 20 or to another process 28 conducted at another location. Feeder 20 dispenses 30 untreated premix and feeder 32

Figure 2:
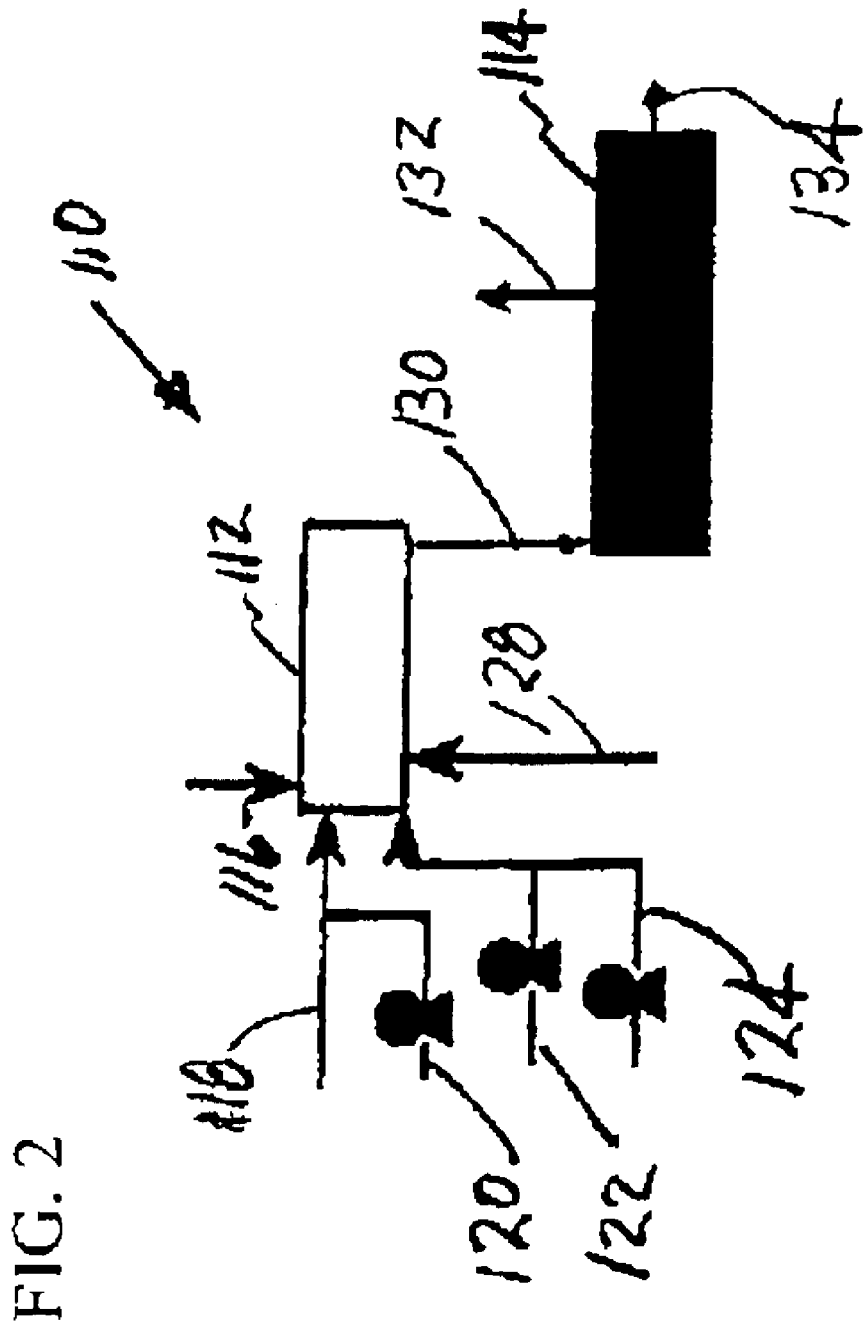
FIG. 2 is a schematic representation of another silicone composition compounding process.

In FIG. 2, a process for compounding filled silicone compositions is designated 110. The system includes first extruder 112 and second extruder 114. The first extruder 112 is a double screw extruder of the co-rotating intermeshing type. Multiple extruder stages can be used as the first extruder 112 to compound filler, treating agent and silicone polymer. The resulting homogenous material can be fed to the second extruder 114. The second extruder 114 is designed to operate at high temperatures and to provide the open surface areas necessary for devolatilization. The ratio of open volume of the first extruder to the second extruder can be between about 0.47 to about 0.62. The ratio of UD of the first extruder to UD of the second extruder can be about 0.37 to about 0.66 or preferably about 0.48 to about 0.52.

In the process of FIG. 2, filler 118, distilled water 118, HMDZ 120, silanol 122 and a vinyl oil 124 are continuously supplied from storage tanks into first extruder 112. Polymer 128 is added and the materials are continuously compounded and discharged as an extrudate 130. The extrudate 130 is continuously fed into second single shaft extruder 114 such as a Pilgrim extruder. Second extruder 114 is provided with a vent for extrudate devolatilization 132. The vent can be a plurality of vents in applications that require more than one vent for effective devolatilization.

After venting 132, a compounded and devolatilized filled silicone composition is discharged 134 at the end of the second extruder ~14. These and other features will become apparent from the following detailed discussion, which by way of example without limitation describes preferred embodiments of the present invention.

EXAMPLE 1

A premix was prepared in a 10L Henschel mixer by charging 66.6 parts of a silicone gum (penetration of 800, 0.2 m %), 33.3 parts of a silicone gum (penetration of 800, 0.5 m %) and 53.5 parts of a fumed silica with a 200 square meter/gram surface area (A-200 Degussa filler). The mixer was rotated for 20 minutes at 3500 RPM. The resulting premix had a talcum powder like appearance with a tap density between 0.42 to 0.46. This premix was used in formulations shown in Table 1.

Formulations 1001, 1002, 1004 and 1005 of Table 1 were prepared by adding premix to a dough mixer along with a silanol fluid plasticizer, a methoxy stopped fluid plasticizer and a vinyl triethoxy silane crosslinker. HMDZ was added in the preparation of formulations 1002 and 1005 and the HMDZ and premix were mixed for 5 minutes in the Henschel mixer prior to adding other additives. Premix and additives were mixed till massed. Each batch was then heated to 700C to 800C and held at this temperature range for '/2 hour with a nitrogen purge. The batch was then heated to 1500C and cooked for 30 minutes.

Formulations 1003 and 1006 were made by mixing a silicone gum (penetration bf 800, 0.2 m %) and a different gum (penetration of 800,0.5 m %) in the mixer for 10 minutes followed by addition of HMDZ and further mixing for 5 minutes. Twenty (20) percent of the filler was added and mixing continued for 15 to 20 minutes. A vinyl triethoxy silane crosslinker was added and mixing was continued for 5 minutes. Then 20 percent of filler was added and mixing continued for 15 to 20 minutes. Then a methoxy stopped fluid plasticizer was added and mixing continued for 5 minutes. Twenty (20) percent more of the filler was added and mixing continued for 15 to 20 minutes followed by heating of the batch to 1200C with a nitrogen purge.

Fifteen (15) percent more of the filler was added and mixing continued for 15 to 20 minutes. One-half of an amount of silanol fluid plasticizer was added and mixing continued for 25 minutes. Then a final 15 percent of filler was added and mixed for 10 to 15 minutes followed by addition of the remaining plasticizer, and the batch was mixed for 10 minutes followed by heating to 500C and cooking for 30 minutes.

The formulations were catalyzed using 1.5 parts 2,4-dichlorobenzoyl peroxide, for every 100 gm of formulation. The catalyzed formulation was press cured for 12 minutes at 2600C on a cold mold. The press cured formulations were further cured at 2000C for 4 hours in an oven. Physical properties were evaluated after equilibrating the post-cured sheets in a controlled humidity environment for 3 hours.

Formulations are reported in the following Table 1:

TABLE 1

| Formulation(gms)/Sample | 1001 | 1002 | 1003 | 1004 | 1005 | 1006 |
|---|---|---|---|---|---|---|
| Premix | 921 | 921 | | 1427 | 1415 | |
| silanol fluid treating agent | 24.6 | 24.6 | 24.6 | 36.1 | 37.6 | 37.8 |
| methoxy fluid treating agent | 15.6 | 15.6 | 15.6 | 24.2 | 23.9 | 23.9 |
| vinyl triethoxy silane cross-linker | 4.9 | 4.9 | 4.9 | 7.5 | 7.5 | 7.5 |
| HMDZ | | 6.8 | 6.8 | | 10.4 | 10.4 |
| DI water | | | | | 5.2 | 5.2 |
| silicone polymer (800, 0.2 m %) | | | 399.6 | | | 614 |
| silicone polymer (800, 0.5 m %) | | | 200.4 | | | 307.9 |
| fumed silica | | | 321 | | | 493.2 |

Properties for the Table 1 formulations are reported in Table 2. In Table 2, Williams Plasticity was measured on 100 gms samples. Nip thickness was between 3/8 f 1/8". Fifteen (15) end to end passes were made and the sample was rested for 10 minutes. All listed times were taken from an initial three minute pass with a Williams plasticity meter. Shore A hardness was measured on three cut-out dumbbells, stacked no less than 0.21" high. Three measurements were taken and the average is reported in the Table 2.

Tensile, elongation and modulus were measured on samples cut in accordance with ASTM D412-87. Dumbbells were' pulled until failure. Averages are reported in Table 2.

Tear resistance was measured on samples cut as per ASTM D624-86. A 0.0020 f 0.002 inch nick was made in each sample. The samples were pulled till tear. Averages are reported in Table 2. Specific gravity was measured using a ratio of sample weight in air to sample weight in water. Compression set was determined by measuring thickness of samples on heating in an oven at 3500F for 22 hours. Volatiles were determined (C-9%) by loss in weight of samples as measured at 1350~50C. for 45 minutes at a vacuum of 20 mm Hg~5 mm Hg.

TABLE 2

| Property/Sample | 1001 | 1002 | 1003 | 1004 | 1005 | 1006 |
|---|---|---|---|---|---|---|
| Specific Gravity | 1.194 | 1.18 | 1.191 | 1.189 | 1.191 | 1.19 |
| Shore A Hardness (Durometer) | 70.8 | 63.9 | 73.2 | 70.4 | 63.5 | 70.3 |
| Tensile Strength (psi) | 1154 | 1364 | 1249 | 1389.8 | 1519.2 | 1405.2 |
| Elongation (%) | 231 | 292 | 241 | 266.4 | 308.8 | 312.4 |
| 100% Module | 425 | 326 | 491 | 428.6 | 332.8 | 395.5 |
| Tear B (ppl) | 78 | 80 | 80 | 81.2 | 85.6 | 94.5 |
| C/S 22 hr, 350 F. (%) | 61.7 | 52.2 | 57.8 | 49 | 43.6 | 16.8 |
| C-9 (%) | 27,23 | 35,33 | 34,40 | | | |

TABLE 2-continued

| Property/Sample | 1001 | 1002 | 1003 | 1004 | 1005 | 1006 |
|---|---|---|---|---|---|---|
| Williams Plasticity | | | | | | |
| 10 min | 251 | 276 | 406 | 332 | 306 | 372 |
| 24 hr | 341 | 340 | 593 | 478 | 358 | 414 |
| 2 day | 505 | 385 | 635 | 518 | 389 | 444 |
| 3 day | 534 | 387 | 701 | 577 | 405 | 451 |
| 1 week | 727 | 457 | 777 | 674 | 456 | 482 |
| 2 week | 871 | 495 | 827 | 790 | 489 | 525 |
| 3 week | 875 | 510 | 853 | 860 | 503 | 552 |
| 4 week | 982 | 542 | 972 | 907 | 524 | 570 |
| 2 month | | | | 1042 | 605 | 743 |
| TRAN | 77.4 | 78.2 | 80 | | | |
| Y1 | 14.5 | 12.8 | 13.3 | | | |
| HAZE | 58.4 | 57.8 | 37.8 | | | |
| L | 88.1 | 88.6 | 89.6 | | | |
| A | 0 | 0.4 | −0.4 | | | |
| B | 7.2 | 6.2 | 6.8 | | | |
| Shrink | | | | | | |
| L (%) | 3.5 | 3.1 | 3.6 | | | |
| W (%) | 0.9 | 1.1 | 0.8 | | | |

Suitable heat-vulcanizable silicone polymer compositions meet the following physical property standards: Williams Plasticity of greater than 100, Shore A hardness of greater than 20, tensile strength of greater than 750 psi, elongation at break of at least 100%, Tear B of at least 10 ppi and Specific Gravity of at least 1.05. Formulations 1002 and 1005 show lower structuring and plasticity over time. The lower durometer and excellent plasticity show that 1002 and 1005 experienced adequate filler treatment. Formulation 1005 shows the importance of adding distilled water for varying treatment levels.

EXAMPLE 2

A pretreated filler (60 parts) is charged into a first Readco co-rotating intermeshing twin screw extruder (UD=7.2) along with pretreated filler (60 parts), a silanol (8 parts), a vinyl silanol (2 parts) and a vinyl crosslinker (3 parts) and is mixed with a high viscosity silicone gum (100) parts. The resulting densified and mixed product is charged into a BUSS single shaft reciprocating extruder (L/D 19) where it is compounded, treated and stripped at a temperature of about 150"C. The product is cooled and evaluated with the results shown in Table 3.

TABLE 3

| Property/Example | Example 2 |
|---|---|
| Shore A Hardness | 69 |
| Tensile Strength (psi) | 1350 |
| % Elongation | 327 |
| Tesnile Modulus (psi) | 371 |
| Tear B (psi) | 106 |
| Specific Gravity | 1.18 |

While preferred embodiments of the invention have been described, the present invention is capable of variation and modification and therefore should not be limited to the precise details of the Examples. The invention includes changes and alterations that fall within the purview of the following claims.

What is claimed is:

1. A continuous process of preparing a heat-vulcanizable filled silicone composition, comprising steps of:
   mixing filler and high viscosity silicone polymer continuously in a mixer; and compounding a filler and silicone polymer mixture from the mixer in a single shaft reciprocating extruder.

2. The process of claim 1, wherein the filler is densified and mixed with the silicone polymer in the mixer and the filler and silicone polymer mixture is compounded, treated and stripped of volatiles in the extruder.

3. The process of claim 1, wherein the filler comprises fumed silica that is pretreated with a silanol treating agent prior to mixing in the mixer.

4. The process of claim 1, wherein the filler comprises a raw, untreated fumed silica and treating agent is added to the mixer with the silica.

5. The process of claim 1, wherein the filler is silica and the processing fluid comprises an amount of HMDZ of about 0.1 parts to about 100 parts by weight to about 100 parts silica and an amount of water of about 0.1 to about 100 parts by weight to 100 parts silica.

6. The process of claim 1, wherein the filler is silica and the processing fluid comprises an amount of HMDZ of about 0.5 parts to about 50 parts by weight to about 100 parts silica and an amount of water of about 0.5 to about 20 parts by weight to 100 parts silica.

7. The process of claim 1, wherein the filler is silica and the processing fluid comprises an amount of HMDZ of about 1.0 parts to about 20 parts by weight to about 100 parts silica and\an amount of water of about 1.0 to about 10 parts by weight silica.

8. The process of claim 1, comprising:
forming a silicone polymer mixture comprising 20 to about 150 parts by weight filler to 100 parts by weight of the high viscosity silicone polymer in the mixing step; and
adding further silicone polymer in the compounding step to reduce the proportion of filler to about 10 to about 100 parts by weight of the total high viscosity silicone polymer.

9. The process of claim 1, comprising:
forming a silicone polymer mixture comprising 30 to about 100 parts by weight filler to 100 part, by weight of the high viscosity silicone polymer in the mixing step; and
adding further silicone polymer in the compounding step to reduce the proportion of filler to about 15 to about 90 parts by weight of the total high viscosity silicone polymer.

10. The process of claim 1, comprising:
forming a silicone polymer mixture comprising 40 to about 70 parts by weight filler to 100 parts by weight of the high viscosity silicone polymer in the mixing step; and
adding further silicone polymer in the compounding step to reduce the proportion of filler to about 25 to about 70 parts by weight of the total high viscosity silicone polymer.

11. The process of claim 1, comprising:
mixing filler and high viscosity silicone polymer continuously in the mixer at a first location; and
compounding the filler and silicone polymer mixture from the mixer in a single shaft reciprocating extruder at another location different from the first location.

12. The process of claim 1, comprising:
mixing filler and high viscosity silicone polymer continuously in the mixer at a first location;
storing the silicone polymer mixture from the mixer in a storage receptacle; and
compounding the filler and silicone polymer mixture from the mixer in the single shaft reciprocating extruder sit another location different from the first location.

13. The process of claim 1, comprising:
mixing the filler with a high viscosity silicone polymer comprising about 0.05% to about 0.5 % by weight vinyl content.

14. The process of claim 1, comprising:
mixing the filler with a high viscosity silicone polymer represented by recurring units of the formula:

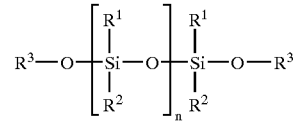

Formula I wherein, $R^1$ independently at each occurrence represents $C_{1-4}$ alkyl, or $C_{2-4}$ alkylene; $R^2$ independently at each occurrence represents $C_{1-4}$ alkyl, $C_1$–$C_4$ haloalkyl or $C_{2-4}$ alkylene; $R^3$ independently at each occurrence represents H, $C_{1-10}$ alkyl, $C_{2-4}$ alkylene, $C_{4-6}$ cycloalkyl, OH or $C_1$–$C_4$ haloalkyl; and n represents an integer from 1,000 to 20,000.

15. The process of claim 1, comprising:
mixing the filler with a high viscosity silicone polymer represented by recurring units of the formula:

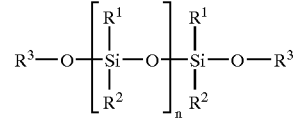

Formula I wherein, $R^1$ independently at each occurrence represents, $CH_3$ or $CH=CH_2$; $R^2$ independently at each occurrence represents, $CH_3$, $CH=CH_2$ or $CH_2CH_2CF_3$; $R^3$ independently at each occurrence represents $CH_3$, $CH=CH_2$, OH or $CH_2CH_2CF_3$ and n represents an integer from about 4,000 to about 10,000.

16. The process of claim 1, comprising mixing the filler with a high viscosity silicone polymer and a silicone polymer with a lower viscosity.

* * * * *